Figure 1:
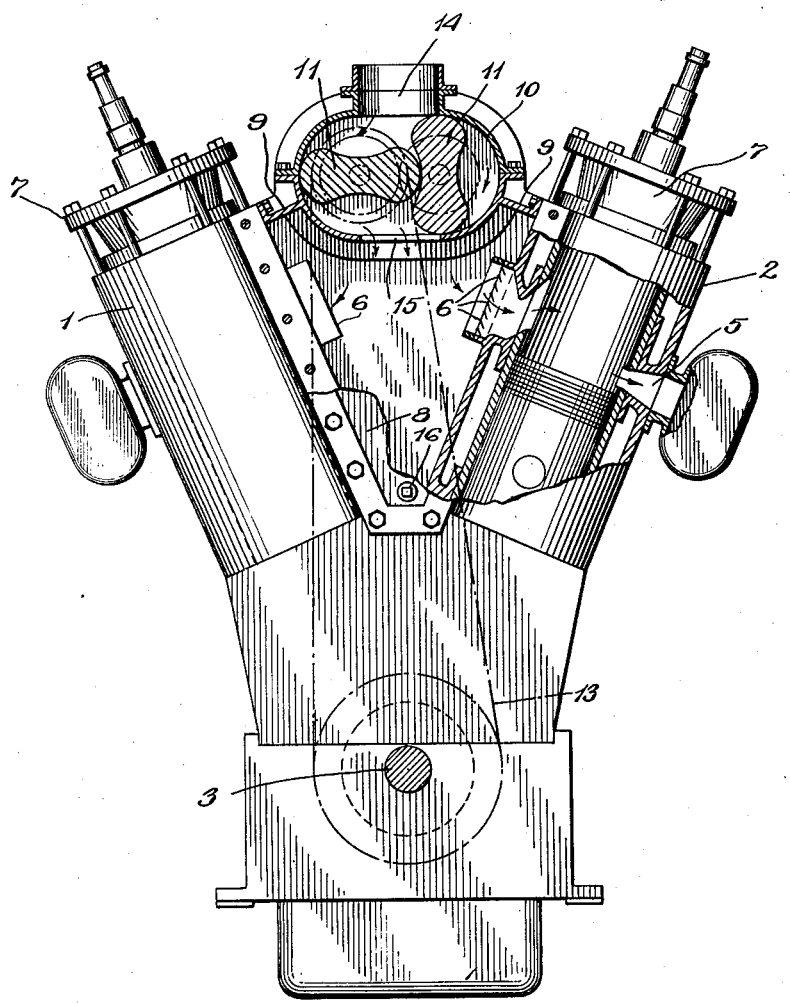

Oct. 13, 1936.   R. SCHNEIDER   2,057,062
V-TYPE TWO-CYCLE ENGINE
Filed Dec. 27, 1932   2 Sheets-Sheet 1

INVENTOR.
Rudolph Schneider
BY
ATTORNEYS.

Oct. 13, 1936.  R. SCHNEIDER  2,057,062
V-TYPE TWO-CYCLE ENGINE
Filed Dec. 27, 1932  2 Sheets-Sheet 2
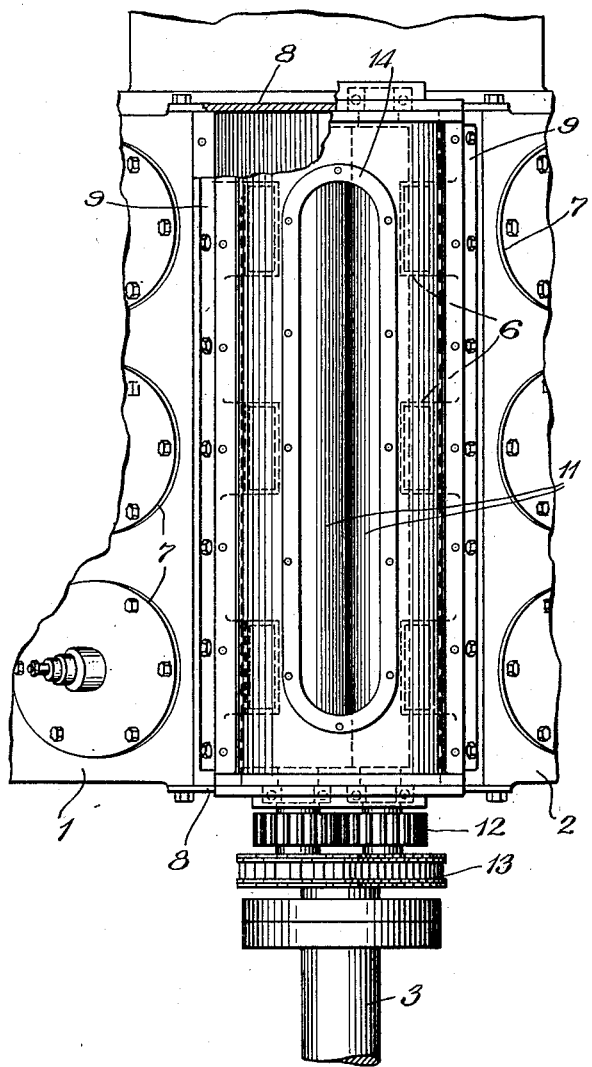

UNITED STATES PATENT OFFICE 2,057,062

V-TYPE TWO-CYCLE ENGINE

Rudolph Schneider, St. Louis, Mo., assignor to Busch-Sulzer Bros.-Diesel Engine Company, St. Louis, Mo., a corporation of Missouri Application December 27, 1932, Serial No. 648,886

9 Claims. (Cl. 123—55)

This invention relates to V-type engines and like apparatus especially engines which require air under pressure for scavenging or supercharging purposes. The objects are general simplification, compactness and reduction of manufacturing cost. The principle of the invention resides in the delivery of air, for example scavenging or supercharging air into or through the trough space between the cylinder rows with which the air ports are connected as hereinbelow set forth, and also in the special location of the air source as well as in other features which will be understood more clearly from the accompanying drawings illustrating a form of the invention.

Fig. 1 is an end elevation partly broken away and Fig. 2 a plan, also in part broken away.

The apparatus shown, being a 2-cycle engine of generally familiar design, is composed of two rows or blocks of engine cylinders, marked 1 and 2 respectively, carried on a suitable base and having their pistons connected to a common crank-shaft 3 in the usual way. Each cylinder is provided with an air admission port and an exhaust port 5, both uncovered by the piston on its down stroke, the air port being additionally controlled by a set of overlapping pivoted louvres 6 serving as a check valve to permit air flow into the cylinder but prevent outflow from it. The individual cylinder heads 7 are shown with fuel injection valves therein and the operation will be understood without explanation.

According to this invention in its preferred form the air ports 6 are located on the proximate sides of the rows of cylinders or cylinder-blocks and the trough-shaped space between the two blocks is closed at its ends by means of two end plates 8 bolted thereto in air-tight fashion. The top of such space is likewise closed in by suitable means so as to form an air passage or manifold common to all of the cylinders. This manifold is bounded on its two sides by the water-jacket walls of the cylinders.

Preferably the top of the trough space is closed in by using the scavenging or supercharging blower for that purpose, which is designed accordingly and of elongated shape so as to serve as a cover, removable as a unit if necessary. In the present case it is composed of a lower casing section 9 formed with suitable marginal flanges by which it is fitted and bolted air-tight to the upper margins of the jacket walls or cylinder blocks, below the cylinder heads, and to the end plates 8. The upper casing section 10 is bolted to the lower section with Roots-type impellers 11 housed and journalled within the two sections.

The impeller shafts which extend through one end of the casing are geared together at 12 and driven from the crankshaft 3 by a sprocket chain 13 or equivalent gearing. Air is taken into the blower at the top, through the entrance 14, and delivered downwardly by the impellers through the bottom outlet 15 directly into the trough-space or air manifold, whence it may pass to the various cylinders as and when the scavenging ports 6 are uncovered by their respective pistons. By thus utilizing all of the trough space as an air manifold the air is conducted to the engine with but a short travel and owing to the size of the space, the pulsations of the blower are largely eliminated so as to maintain a substantially constant pressure therein. A drain plug 16 is provided in the end closure. By making the blower elongated in the direction of its rotary axes so that the impellers are substantially as long as the engine, it is found that the air capacity is easily adequate to serve all the cylinders. However within the invention the trough space can be used in other ways and can be closed in by means other than the blower and the end plates or closures can serve other purposes as well, as for instance, the support of the engine control mechanism and oil pumps, not shown, but special advantages will be recognized in arranging the blower as shown between the cylinder heads or over or partly within the trough space since this not only produces an extremely compact engine structure but also ties the two sides of the engine frame together improving rigidity and avoiding the usual bulky air conduit which commonly characterizes 2-cycle injection engines.

I claim:—

1. An engine comprising two rows of engine cylinders with a common crank-shaft and having air admission ports uncovered by the pistons on the proximate sides of said rows, an air supply conduit for said ports between said rows formed by a removable cover member attached to the engine cylinders, the walls of the cylinders and the end closures attached respectively to the ends of said rows.

2. In a V-type engine, the combination with two rows of engine cylinders arranged at a V-angle with a trough space between them, of an air compressor to supply said cylinders comprising two compressor sections one of which serves to tie the two rows together being bolted by its opposite margins to the uppermost margins of said rows overlying said trough space.

3. A V-type engine comprising two parallel rows of engine cylinders serving a common crank-shaft and formed in water-jacketed blocks with two or more cylinders in each block, the proximate walls of said blocks being at a V-angle to each other and defining a trough between them, means extending from the bottom of said trough substantially to the upper margins of said blocks for closing in the ends of such trough, and cover means connected to the upper margins of said blocks and to said end-closing means adapting substantially the whole of said trough space, including a part of it that is bounded by the water-jacket walls of the blocks, to serve as an air manifold for the engine, and means for supplying air to the manifold so formed, the cylinders having air-port communication therewith.

4. A V-type engine having a blower overlying the trough space between the rows of cylinders and mounted on the cylinders between the cylinder heads thereon and delivering into said space, said cylinders having piston-controlled air admission ports arranged on the proximate sides of the rows and supplied with air by said blower.

5. An engine comprising two rows of engine cylinders serving one crank-shaft and having air admission ports uncovered by the pistons and means including an air blower for closing in the space between the rows to form an air conduit thereof to supply said air ports.

6. An engine comprising two rows of engine cylinders serving a single crank-shaft and having piston-controlled air admission ports, a blower casing overlying and covering the space between said rows and other means for closing in said space to form the same into an air supply conduit for said air ports.

7. A V-type engine having piston-controlled ports opening into the trough space between the rows of cylinders, the ends of said trough space being closed in, an air blower having a two-part casing the lower section thereof being bolted to the top part of said trough space and serving as a cover therefor, said blower being of elongated dimensions conforming to the space between cylinder heads and discharging into said trough space and having its impeller drive shaft extended longitudinally beyond the casing for connection to the engine crank-shaft.

8. A V-type engine having piston-controlled air ports located on the proximate sides of the rows of cylinders, an air blower secured to the jacket walls of said cylinders below the cylinder heads thereof, said blower being elongated to conform to and occupy in part the trough-space between said rows and discharging into said trough space and having its drive shaft longitudinally extended beyond said trough space and geared to the engine crank-shaft.

9. A V-type engine comprising two water-jacketed cylinder blocks each containing several engine cylinders and disposed at a V-angle to the other so as to form a trough space between their proximate walls, air-ports leading from said space through said walls to the interiors of the respective cylinders, means applied to the tops and ends of said blocks for hermetically closing in said trough space to constitute the same as an air manifold to said air-ports, and a rotary air compressor supplying air under pressure to said manifold, said closing-in means being constituted in part by the casing structure of said compressor.

RUDOLPH SCHNEIDER.